US011358714B2

(12) United States Patent
Bender et al.

(10) Patent No.: US 11,358,714 B2
(45) Date of Patent: Jun. 14, 2022

(54) AIRCRAFT

(71) Applicant: Dr. Ing. h.c. F. Porsche Aktiengesellschaft, Stuttgart (DE)

(72) Inventors: Stefan Bender, Löchgau (DE); Mikel Fauri, Ludwigsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 392 days.

(21) Appl. No.: 16/502,324

(22) Filed: Jul. 3, 2019

(65) Prior Publication Data

US 2020/0010186 A1    Jan. 9, 2020

(30) Foreign Application Priority Data

Jul. 4, 2018    (DE) .......................... 102018116147.6

(51) Int. Cl.
| | |
|---|---|
| *B64C 29/00* | (2006.01) |
| *B64C 27/28* | (2006.01) |
| *B64D 29/02* | (2006.01) |
| *B64C 27/52* | (2006.01) |
| *B64C 3/56* | (2006.01) |
| *B64C 3/16* | (2006.01) |

(52) U.S. Cl.
CPC ............ *B64C 29/0025* (2013.01); *B64C 3/16* (2013.01); *B64C 3/56* (2013.01)

(58) Field of Classification Search
CPC ..... B64C 27/28; B64C 27/52; B64C 29/0033; B64C 2201/102; B64C 2201/162; B64C 3/56; B64C 2201/141; B64D 29/02; B64D 29/06

USPC ......................................................... 244/7 A
See application file for complete search history.

(56) References Cited

U.S. PATENT DOCUMENTS

| | | | | |
|---|---|---|---|---|
| 1,414,241 | A | | 4/1922 | Wells |
| 1,783,458 | A | * | 12/1930 | Windsor ............. B64C 29/0033 244/6 |
| 2,973,166 | A | * | 2/1961 | Stahmer .............. B64C 29/0025 244/23 R |
| 3,179,354 | A | * | 4/1965 | Alvarez-Calderon ...................... B64C 23/00 244/12.4 |
| 3,273,653 | A | * | 9/1966 | McLarty ............. B64C 29/0033 416/122 |
| 4,828,203 | A | * | 5/1989 | Clifton ................ B64C 29/0025 244/12.3 |
| 5,275,356 | A | * | 1/1994 | Bollinger ............ B64C 29/0016 244/12.3 |
| 5,320,305 | A | * | 6/1994 | Oatway ............... B64C 29/0025 244/12.3 |

(Continued)

FOREIGN PATENT DOCUMENTS

| | | |
|---|---|---|
| CN | 105035303 A | 11/2015 |
| CN | 106428547 A | 2/2017 |

(Continued)

OTHER PUBLICATIONS

Great Britain Combined Search and Examination Report for Great Britain Application No. GB1909484.6, dated Dec. 4, 2019, 4 pages.

*Primary Examiner* — Christopher P Ellis
(74) *Attorney, Agent, or Firm* — RatnerPrestia

(57) ABSTRACT

An aircraft includes a fuselage and propellers, wherein the propellers can be retracted beneath the fuselage.

8 Claims, 5 Drawing Sheets

(56) References Cited

U.S. PATENT DOCUMENTS

| | | | |
|---|---|---|---|
| 5,407,150 A * | 4/1995 | Sadleir | B64C 29/0025 244/12.4 |
| 6,732,972 B2 * | 5/2004 | Malvestuto, Jr. | B64C 23/08 244/12.3 |
| 6,843,447 B2 * | 1/2005 | Morgan | B64C 29/0025 244/12.3 |
| 6,860,449 B1 * | 3/2005 | Chen | B64B 1/06 244/12.1 |
| 7,857,253 B2 * | 12/2010 | Yoeli | B64C 1/22 244/12.3 |
| 8,181,903 B2 * | 5/2012 | Posva | B64C 29/0025 244/12.3 |
| D740,201 S * | 10/2015 | Wang | D12/326 |
| 9,284,058 B2 * | 3/2016 | Wang | B64C 29/0033 |
| 9,550,567 B1 * | 1/2017 | Erdozain, Jr. | B64C 29/02 |
| 9,676,479 B2 * | 6/2017 | Brody | B64C 9/00 |
| D808,329 S * | 1/2018 | Parks | D12/328 |
| 10,287,011 B2 * | 5/2019 | Wolff | B64C 39/024 |
| 10,562,623 B1 * | 2/2020 | Sloan | B64C 39/024 |
| 11,034,443 B2 * | 6/2021 | Frolov | B64C 37/00 |
| 11,148,797 B1 * | 10/2021 | Robertson | B64D 35/06 |
| 2003/0057331 A1 * | 3/2003 | Kinkead | G05D 1/102 244/194 |
| 2003/0085319 A1 * | 5/2003 | Wagner | B64C 29/0025 244/12.3 |
| 2006/0192046 A1 * | 8/2006 | Heath | B64D 35/04 244/12.3 |
| 2007/0018035 A1 * | 1/2007 | Saiz | B64C 29/0033 244/12.3 |
| 2007/0057113 A1 * | 3/2007 | Parks | B64C 29/0041 244/12.5 |
| 2007/0158494 A1 | 7/2007 | Burrage | |
| 2007/0246601 A1 * | 10/2007 | Layton | B64C 39/024 244/12.2 |
| 2009/0224098 A1 * | 9/2009 | Karem | B64C 25/02 244/87 |
| 2010/0012774 A1 * | 1/2010 | Fanucci | F42B 12/365 244/49 |
| 2010/0252690 A1 * | 10/2010 | Hothi | B64C 39/024 244/7 B |
| 2013/0062455 A1 * | 3/2013 | Lugg | B64C 39/12 244/12.3 |
| 2014/0032034 A1 * | 1/2014 | Raptopoulos | G05D 1/0088 701/25 |
| 2014/0158816 A1 * | 6/2014 | DeLorean | B64C 27/32 244/12.4 |
| 2015/0136897 A1 | 5/2015 | Seibel et al. | |
| 2015/0175260 A1 | 6/2015 | Hesselbarth | |
| 2015/0298799 A1 | 10/2015 | Bertrand et al. | |
| 2015/0344134 A1 * | 12/2015 | Cruz Ayoroa | B64C 39/12 244/48 |
| 2016/0009387 A1 * | 1/2016 | Kummer | B64C 29/0066 244/6 |
| 2016/0114887 A1 * | 4/2016 | Zhou | H04N 5/23238 348/148 |
| 2016/0200436 A1 * | 7/2016 | North | B64C 25/52 244/7 R |
| 2016/0363938 A1 * | 12/2016 | Frolov | G05D 1/005 |
| 2017/0057630 A1 * | 3/2017 | Schwaiger | B64D 27/04 |
| 2017/0174342 A1 * | 6/2017 | Huang | B64C 29/0033 |
| 2017/0305526 A1 * | 10/2017 | Thomassey | B64C 27/26 |
| 2018/0044014 A1 * | 2/2018 | Sapargaliyev | B64C 39/08 |
| 2018/0141653 A1 * | 5/2018 | Romo | B64C 3/56 |
| 2018/0155021 A1 * | 6/2018 | Patterson | B64C 29/0033 |
| 2018/0170517 A1 * | 6/2018 | Ratti | B64C 29/0033 |
| 2018/0297698 A1 * | 10/2018 | Dhall | B64C 11/28 |
| 2018/0312251 A1 * | 11/2018 | Petrov | B64C 27/28 |
| 2018/0354612 A1 * | 12/2018 | Hefner | B64C 29/02 |
| 2019/0106206 A1 * | 4/2019 | Shi | B64C 11/001 |
| 2019/0135426 A1 * | 5/2019 | Bailie | B64C 3/56 |
| 2020/0010182 A1 * | 1/2020 | Renteria | A63H 27/02 |
| 2020/0039629 A1 * | 2/2020 | Bosworth | B64C 29/0025 |
| 2020/0255136 A1 * | 8/2020 | Karem | B64D 1/10 |
| 2020/0269967 A1 * | 8/2020 | Chen | B64C 3/32 |
| 2020/0354049 A1 * | 11/2020 | Noppel | B64C 39/024 |
| 2021/0031911 A1 * | 2/2021 | Sinha | B64C 5/02 |
| 2021/0047029 A1 * | 2/2021 | Stanney | B64C 27/82 |
| 2021/0107667 A1 * | 4/2021 | Sinha | B64D 27/26 |

FOREIGN PATENT DOCUMENTS

| | | | | |
|---|---|---|---|---|
| CN | 206358357 U | | 7/2017 | |
| CN | 107021206 A | | 8/2017 | |
| DE | 3917499 A1 | | 12/1990 | |
| DE | 3917499 A1 | * | 12/1990 | ......... B64C 29/0033 |
| DE | 102012010937 A1 | | 12/2013 | |
| DE | 102012104783 A1 | * | 12/2013 | ......... B64C 29/0033 |
| DE | 102012104783 A1 | | 12/2013 | |
| EP | 2098714 A2 | * | 9/2009 | ............ F02K 3/065 |
| ES | 2524383 A1 | | 12/2014 | |
| GB | 554084 A | * | 6/1943 | ............... B64C 3/56 |
| GB | 1088153 A | * | 10/1967 | .......... B64C 25/423 |
| RU | 98394 U1 | | 10/2010 | |
| RU | 2627965 C1 | | 8/2017 | |
| WO | WO-2011146349 A2 | * | 11/2011 | ............ G05D 1/102 |
| WO | 2016200502 A2 | | 12/2016 | |
| WO | 2017121038 A1 | | 7/2017 | |
| WO | 2018078388 A1 | | 5/2018 | |
| WO | WO-2018209911 A1 | * | 11/2018 | ............... B64C 3/56 |

* cited by examiner

AIRCRAFT

CROSS-REFERENCE TO RELATED APPLICATION

This application claims priority to German Patent Application No. 10 2018 116 147.6, filed Jul. 4, 2018, the content of such application being incorporated by reference herein in its entirety.

FIELD OF THE INVENTION

The present invention relates to an aircraft, in particular a fully electric aircraft which is capable of taking off and landing vertically (vertical take off and landing, VTOL).

BACKGROUND OF THE INVENTION

In aerospace technology, VTOL denotes, across all languages, any type of aircraft, drone or rocket which has the capability to take off and land again substantially vertically and without a runway. In the following text, this collective term is used in a broad sense which includes not only fixed wing aircraft with airfoils, but also rotary wing aircraft such as helicopters, gyrocopters, gyrodynes and hybrids such as compound helicopters or compound gyroplanes and convertiplanes. Furthermore, aircraft are to be included with the capability of taking off and landing in particularly short distances (short take off and landing, STOL), taking off in short distances but landing vertically (short take off and vertical landing, STOVL) or taking off vertically but landing horizontally (vertical take off and horizontal landing, VTHL).

WO2016200502A2, which is incorporated by reference herein, discloses a manned aircraft which is suitable for vertical take off and landing with the use of the same power units for take off and landing and for forward flying, and has removable wing sections which permit a reconfiguration with different wing section types, as a result of which configurations are made possible which are adapted for a defined flight profile.

DE102012104783A1, which is incorporated by reference herein, proposes an aircraft which comprises a rigid airfoil which makes aerodynamic horizontal flying possible. Furthermore, at least four rotors are provided that are driven via controllable electric motors and can be pivoted by means of a pivoting mechanism between the vertical take off position and the horizontal flying position. Here, all the electric motors and rotors are arranged on the rigid airfoil.

SUMMARY OF THE INVENTION

Described herein is an aircraft, in particular a fully electric aircraft which is capable of vertical take off and landing. The aircraft comprises a fuselage and propellers, wherein the propellers are configured to be retracted beneath the fuselage.

One benefit of said aircraft lies in the fact that the propeller components are exposed to the wind only when they are actually required. A further advantage is to be seen in the small footprint of the aircraft in the case of retracted propellers.

The aircraft can be equipped with folded or even selectively foldable airfoils. One corresponding variant enlarges the wing area which is active during horizontal flying, without increasing the footprint of the aircraft, however.

Furthermore, the aircraft may have a rapidly chargeable battery system which provides the drive energy for vertical take off and landing and horizontal flying, and makes brief charging of the aircraft at a standstill possible.

Here, in order to drive the aircraft, instead of exposed rotors, a plurality of ducted fans, even of different sizes, can be used, as are known outside of aeronautical engineering, for instance from hovercraft or airboats. In an embodiment of this type, the cylindrical housing which surrounds the propeller is capable of considerably reducing the thrust losses as a consequence of vortices at the blade tips. Suitable ducted fans may be oriented horizontally or vertically, may be configured such that they can be pivoted between the two positions or, for aerodynamic reasons, may be covered by way of louvers during horizontal flying. In addition, a pure horizontal thrust generation by means of stationary ducted fans is conceivable.

Finally, in addition to preferably fully autonomous operation of the aircraft, the granting of manual control to human pilots with sufficient qualification comes into consideration, which imparts the greatest possible flexibility in terms of handling to the apparatus according to aspects of the invention.

BRIEF DESCRIPTION OF THE DRAWINGS

One exemplary embodiment of the invention is shown in the drawing and will be described in greater detail in the following text.

DETAILED DESCRIPTION OF THE INVENTION

The terms 'fan,' 'rotor' and 'propeller' may be used interchangeably herein.

Figure 1:
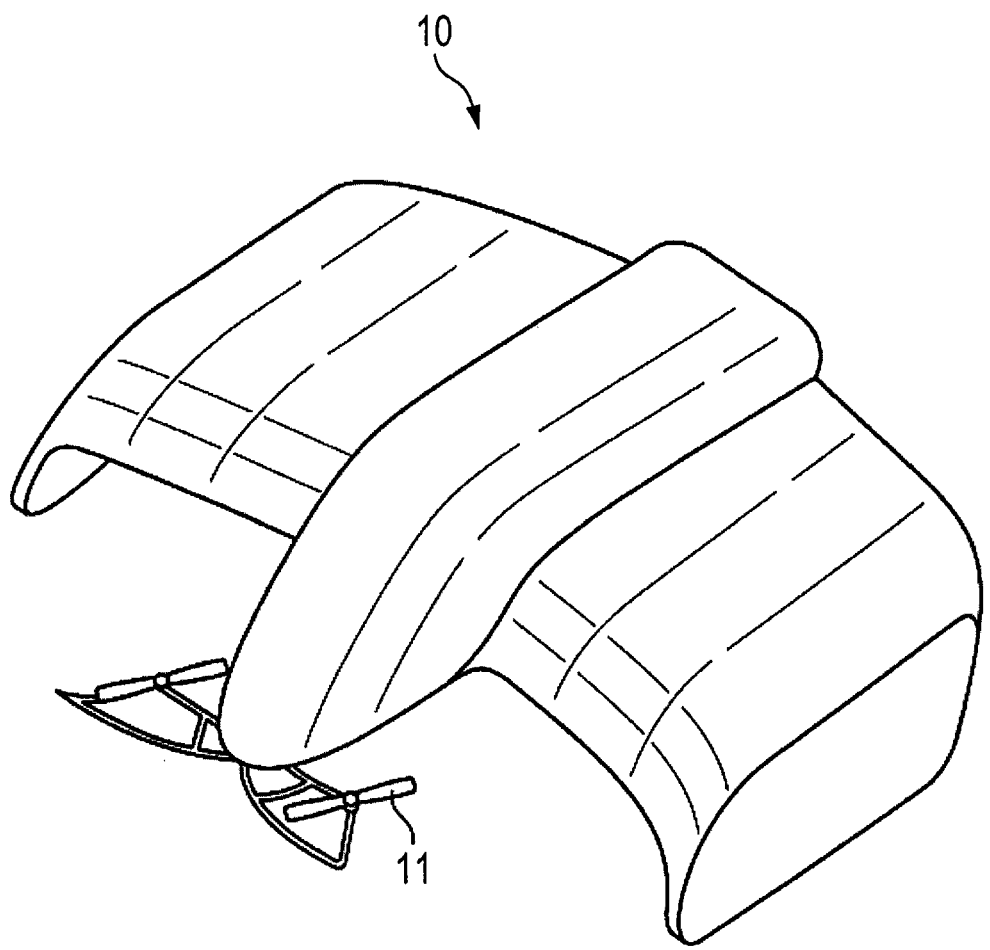
FIG. 1 shows the perspective view of an aircraft.

FIG. 1 illustrates the structural features of one preferred refinement of the aircraft 10 according to aspects of the invention. As a feature which is essential to the invention, the aircraft 10 has propellers 11 on both sides on its nose, which propellers 11 can be deployed laterally, in particular for take off and landing, and in contrast can be retracted beneath the nose of the aircraft 10 in a space-saving manner in the parked position and during en route flying (see, e.g., FIGS. 2-4).

It goes without saying that the described core concept can be transferred to a very wide variety of propeller arrangements although the drawing indicates a rotational axis of the propellers 11 which is substantially parallel to the yaw axis Z of the aircraft 10, without departing from the scope of the invention.

Figure 2:
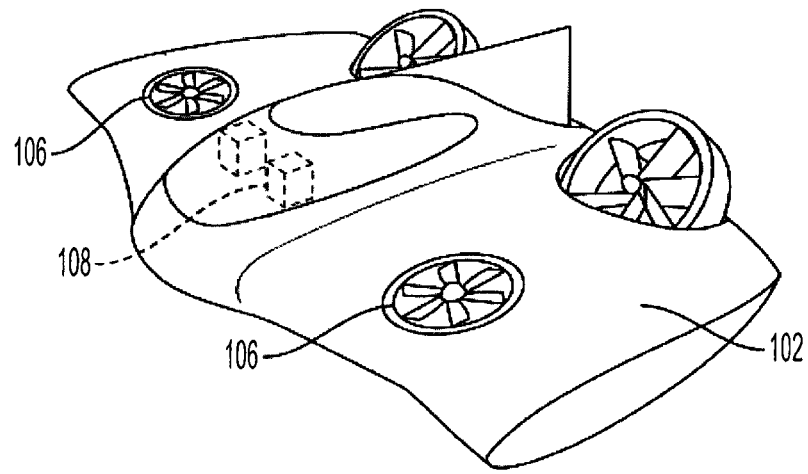
FIG. 2 depicts an isometric view of an aircraft, wherein the wings are shown in an extended configuration and the rear propellers are shown in an angled orientation.
Figure 3:
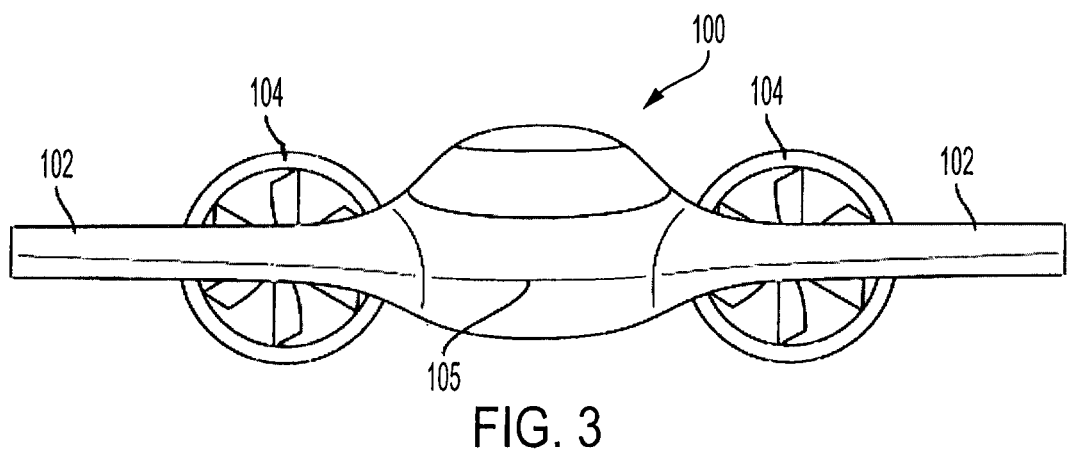
FIG. 3 depicts a front elevation view of the aircraft of FIG. 2, wherein the wings are shown extended configuration and the rear propellers are shown in a cruising orientation.
Figure 4:
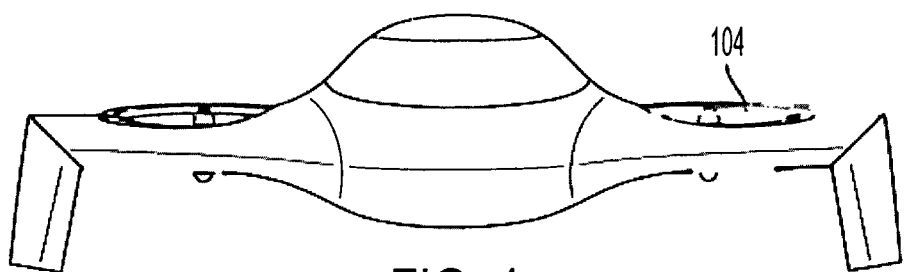
FIG. 4 depicts another front elevation view of the aircraft, wherein the wings are shown in a folded configuration and the rear propellers are shown in a take-off/landing orientation.

FIGS. 2-4 depict an aircraft 100. The aircraft 100 shown in those figures may appear different from the previously described aircraft 10, however, many (if not all) of the details of the previously described aircraft also apply to aircraft 100.

The aircraft 100 includes foldable wings 102. The wings 102 are shown in a folded configuration in FIG. 4 and an extended configuration in FIG. 3. A motor or solenoid is configured to move the wings between those configurations.

Rear propellers 104 are mounted on the trailing edge of the airfoils or wings 102 (i.e., the edge furthest from the nose 105). Propellers 104 may be referred to as cruising propellers because they are used during the cruising operation of the aircraft (at least in one position of the propellers 104). The propellers 104 are configured to pivot between two different positions, as shown in FIGS. 2-4. In the vertical position of the propellers 104 shown in FIG. 3, the propellers 104 generate maximum horizontal thrust for cruising operation of the aircraft (i.e., while the aircraft is flying through the air). In the horizontal position of the propellers 104 shown in FIG. 4, the propellers 104 generate maximum vertical thrust for take-off and landing operations of the aircraft. A motor or solenoid is configured to move the propellers 104 between those two positions. Alternatively, the propellers 104 may be immovable and fixed in a vertical position, as shown in FIG. 2.

Horizontally mounted propellers 106 are fixedly mounted and integrated into the wings 102. Unlike the propellers 104, the position of the propellers 106 is fixed, however, those skilled in the art will recognize that the propellers 106 could be modified so that they are pivotable between vertical and horizontal positions. The propellers 106 generate maximum vertical thrust for take-off and landing operations of the aircraft. The propellers 106 may also be referred to herein as lifting propellers.

The propellers 104 and 106, which may also be referred to herein as fans, may be operated by a fully-electric drive. To that end, a battery charging system 108 including a charger, an inverter and a fast-charging battery are positioned within the fuselage of the aircraft for powering the propellers 104 and 106. The fuselage may also be configured to carry one or more passengers.

Figure 5:
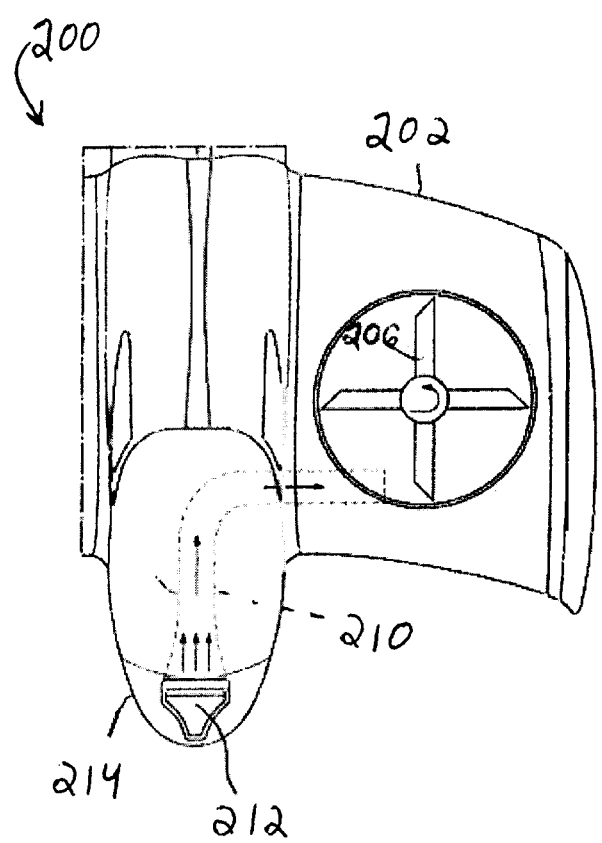
FIG. 5 depicts a top plan view of a portion of an aircraft, showing an internal duct extending between a nose of the aircraft and a horizontal fan mounted to the wing.
Figure 6:
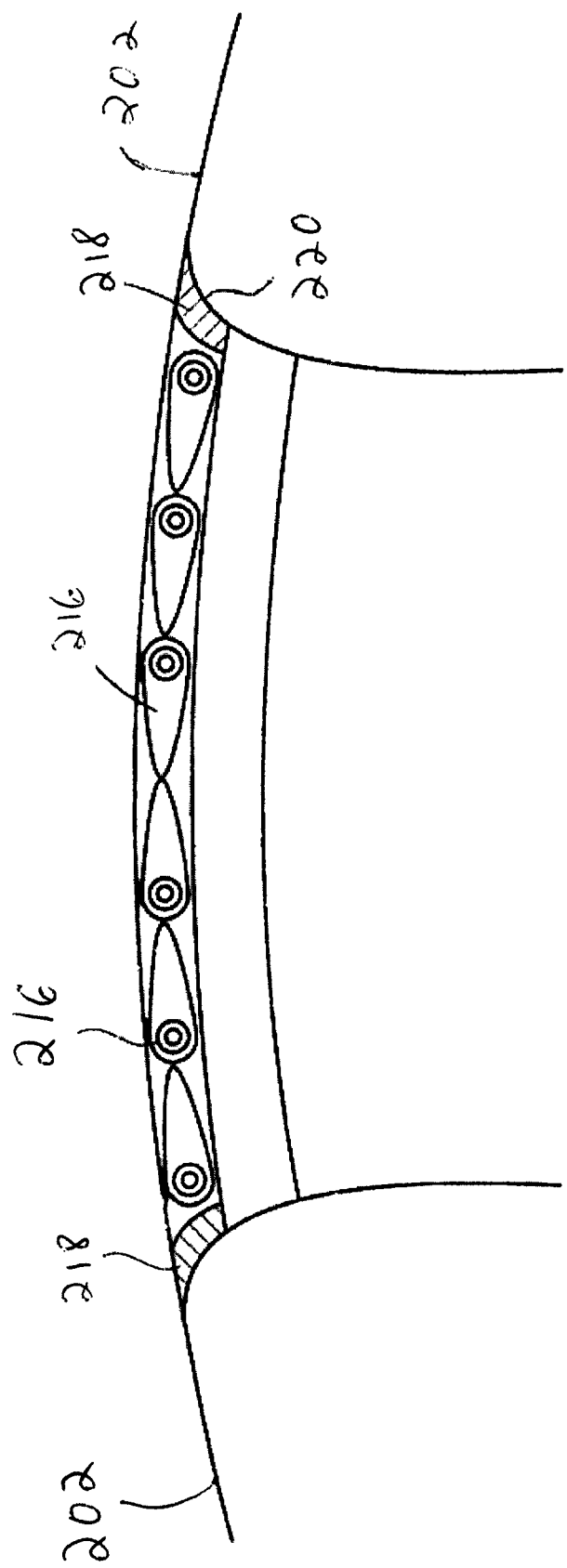
FIG. 6 depicts moveable louvers applied on top of the horizontal fan of FIG. 5, wherein the louvers are shown in a closed position.
Figure 7:
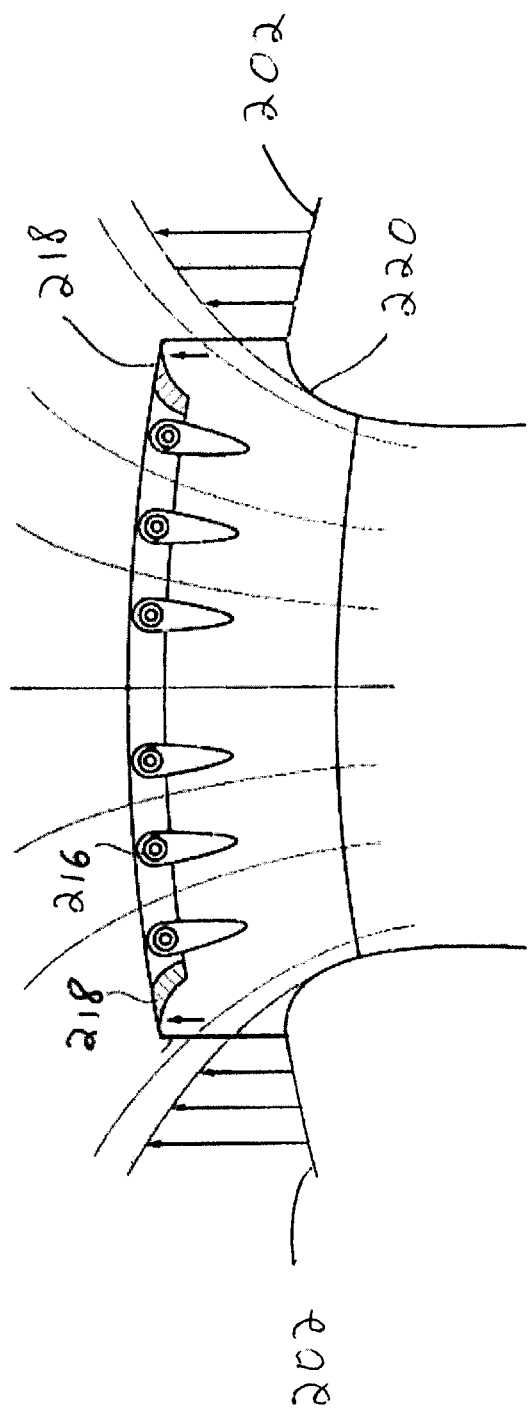
FIG. 7 depicts the movable louvers of FIG. 6, wherein the louvers are shown in an open position.

FIGS. 5-7 depict views of an aircraft 200. The aircraft 200 shown in those figures may appear different from the previously described aircraft 100, however, most (if not all) of the details of the previously described aircraft 100 also apply to aircraft 200. Only a segment of the aircraft 200 is shown in FIG. 5. An air duct 210 extends between an opening 212 formed on the nose 214 of the aircraft 200 and the horizontally mounted propeller 206 that is fixedly mounted to the wing 202. In operation, air is delivered to the propeller 206 via the duct 210, as depicts by the arrows. Although not shown, air ducts that are similar to duct 210, may extend to the propeller 206 on the opposite wing 202, as well as any rear propellers 104 (not shown in these views). Accordingly, the propellers may be referred to as either "ducted propellers" or "ducted fans."

FIGS. 6 and 7 depict louvers 216 that are configured to selectively cover the horizontally mounted propellers 206. It is noted that the louvers 216 are omitted from FIG. 5 for clarity purposes. Each louver 216 is rotatable about a shaft (or otherwise moveable) between a closed position (FIG. 6) and an open position (FIG. 7). The louvers 216, which are flush with the top face of the wing 202, may be moved to the closed position during the cruising operation of the aircraft 200 for aerodynamic purposes. The louvers 216 may be moved to an open position at any time during operation of the propellers 206 to permit the exit or entrance of air therethrough. A motor or solenoid is configured to move the louvers 216 between those positions. It is noted that the louvers are shown in a closed position in FIG. 2.

A sealing ring 218 surrounds the louvers 216 and is moveable between a retracted position (FIG. 6) and a deployed position (FIG. 7). The louvers 216 are mounted to the sealing ring 218 and move therewith between the retracted and deployed positions. The lower surface of the sealing ring 218 is configured to be in sealing relationship with an opening 220 formed in the wing 202. It should be understood that the opening 220 accommodates the body of the propeller 206. The sealing ring 218 may be moved to the retracted position, which is flush with the top face of the wing 202, during cruising operation of the aircraft 200 for aerodynamic purposes. Alternatively, the sealing ring 218 may be moved to the deployed (i.e., extended) position at any time during operation of the propellers 206 to permit the exit or entrance of air, as depicted by the arrows in FIG. 7. A motor or solenoid is configured to move the sealing ring 218 between those positions.

What is claimed is:

1. An aircraft comprising:
   a fuselage;
   foldable wings extending outwardly from the fuselage;
   a first set of propellers that are mounted on foldable wings, wherein the first set of propellers are fixed on the foldable wings for generating vertical thrust during take off and landing operations;
   a second set of propellers that are mounted on a trailing edge of the foldable wings at a location that is rearward of the first set of propellers, as viewed in a forward direction of travel of the aircraft, wherein the second set of propellers are movable between (i) a first orientation where the second set of propellers are oriented for generating vertical thrust during take off and landing operations, and (ii) a second orientation where the second set of propellers are oriented for generating horizontal thrust for cruising;
   an opening formed in one of the wings that communicates with one propeller of the first set of propellers associated with said wing;
   louvers mounted at the opening, wherein the louvers are configured to selectively cover the opening and said one propeller of the first set of propellers in a closed position of the louvers, wherein each louver is configured to move between the closed position and an open position; and
   a sealing ring to which the louvers are each connected, wherein the sealing ring is movable between (i) a deployed position in which the sealing ring and the louvers are spaced apart from the opening to permit the entrance of air to said one propeller, and (ii) a retracted position where the sealing ring is flush with the opening.

2. The aircraft as claimed in claim 1, wherein the each propeller of the first set of propellers has a rotational axis which is parallel to a yaw axis of the aircraft.

3. The aircraft as claimed in claim 1, wherein the aircraft has a fully electric drive.

4. The aircraft as claimed in claim 1, wherein the aircraft comprises a chargeable battery system.

5. The aircraft as claimed in claim 1, further comprising an opening formed on a nose of the fuselage and an air duct extending from the opening to the first set of propellers.

6. The aircraft of claim 1, wherein each foldable wing includes a fixed portion extending from the fuselage and a foldable portion that is pivotably mounted to the fixed portion.

7. The aircraft of claim 6, wherein each propeller of the first and second sets of propellers is mounted to one of the fixed portions.

8. The aircraft of claim 1, wherein one propeller of the first set of propellers and one propeller of the second set of propellers are mounted to the same wing of the foldable wings.

* * * * *